US010057306B1

(12) United States Patent
Froment et al.

(10) Patent No.: US 10,057,306 B1
(45) Date of Patent: Aug. 21, 2018

(54) DYNAMIC SOCIAL NETWORK ALLOCATION AND DATA ALLOCATION BASED ON REAL WORLD SOCIAL INTERACTION PATTERNS

(71) Applicant: Amazon Technologies, Inc., Seattle, WA (US)

(72) Inventors: Arnaud Marie Froment, San Jose, CA (US); Kenneth Paul Kiraly, Menlo Park, CA (US); Levon Dolbakian, Los Gatos, CA (US); Nadim Awad, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 546 days.

(21) Appl. No.: 14/707,629

(22) Filed: May 8, 2015

(51) Int. Cl.
*G06F 15/16* (2006.01)
*H04L 29/06* (2006.01)
*H04L 29/12* (2006.01)
*G06F 17/30* (2006.01)

(52) U.S. Cl.
CPC ...... *H04L 65/403* (2013.01); *G06F 17/30091* (2013.01); *G06F 17/30117* (2013.01); *H04L 61/609* (2013.01)

(58) Field of Classification Search
CPC ................ H04L 65/403; H04L 61/609; G06F 17/30091; G06F 17/30117
See application file for complete search history.

(56) References Cited

U.S. PATENT DOCUMENTS

| 2001/0025248 A1* | 9/2001 | Nihei | G06Q 10/109 455/414.1 |
| 2008/0140650 A1* | 6/2008 | Stackpole | G06F 17/3087 |
| 2014/0149519 A1* | 5/2014 | Redfern | H04L 65/403 709/206 |
| 2015/0195410 A1* | 7/2015 | de Castro | H04W 8/24 455/416 |

(Continued)

OTHER PUBLICATIONS

Lobbyfriend, "Taking Hotels to the Next Level!," retrieved Jul. 15, 2015, from internet address http://www.lobbyfriend.com/about-us, 3 pages.

(Continued)

*Primary Examiner* — Viet D Vu
(74) *Attorney, Agent, or Firm* — Davis Wright Tremaine LLP

(57) ABSTRACT

A social networking system creates and manages dynamic social circles corresponding to real world social events where multiple people join in an event. The social networking system has stored conditions that, when met, for creating, closing, and deleting a social circle, and also determines which users are part of the social circle and for what time periods. Assets, such as photos, URLs, media selections, etc. that are used by members of the social circle during the event are recorded by the social networking system and access to those assets are selectively provided to members of the social circle. A social circle might be automatically opened when users congregate. A social circle closes when the event is over. Once closed, the assets might not change but continue to be available to members until the social circle is deleted. The social networking system might be a central system or a distributed system.

19 Claims, 11 Drawing Sheets

(56) References Cited

U.S. PATENT DOCUMENTS

2015/0215748 A1* 7/2015 Brunn .................... H04W 4/08
                                                     455/518
2016/0005003 A1* 1/2016 Norris .................... G06Q 10/10
                                                     705/7.19

OTHER PUBLICATIONS

Lobbyfriend, "Benefits for Guests" and "Benefits for Hotel," retrieved Jul. 15, 2015, from internet address http://www.lobbyfriend.com/hotels, 2 pages.

Lobbyfriend, "Welcome to LobbyFriend," (third party vendor platform) retrieved Jul. 15, 2015, from internet address http://www.lobbyfriend.com/vendors, 3 pages.

LoKast, "What is LoKast?," retrieved Jul. 15, 2015, from internet address http://www.lokast.com/what-is-lokast/, 2 pages.

LoKast, "Who uses LoKast?," retrieved Jul. 15, 2015, from internet address http://www.lokast.com/who-uses-lokast/, 1 page.

LoKast, "LoKast as a service," retrieved Jul. 15, 2015, from internet address http://www.lokast.com/lokast-as-a-service/, 1 page.

LoKast, "LoKast App," retrieved Jul. 15, 2015, from internet address http://www.lokast.com/lokast-app/, 1 page.

Mashable, "Create a Group Texting Party for the Length of a Show," retrieved Jul. 15, 2015, from internet address http://mashable.com/2010/10/27/fast-society/, 2 pages.

Mashable, "Group-Texting War Heats Up: Fast Society Comes to Android & Updates iPhone App," retrieved Jul. 15, 2015, from internet address http://mashable.com/2011/03/08/fast-society-2-0/, 2 pages.

Gigaom, "GroupMe, Fast Society Create Private Mobile Social Networks," retrieved Jul. 15, 2015, from internet address https://gigaom.com/2010/10/28/groupme-fast-society-create-private-mobile-social-networks/, 4 pages.

* cited by examiner

| | | |
|---|---|---|
| Social_Circle_Unique_ID | 20150301ABC | |
| Social_Circle_Name | Dinner Meeting, March 1 | |
| Start_Time | 20150301.1900 | |
| Close_Time | 20150302.0032 | |
| Time_to_Live | 20150430.2000 | |
| Membership_List | <pointer to first Membership record> | |
| Asset_List | <pointer to first Asset record> | |
| Add_Member_Condition | (on guest list) AND (within 10 ft of a present member) | |
| Remove_Member_Condition | (not within 30 ft of any other present member) | |
| Hysteresis_Rule | (no changes in status for 15 minutes after a change in status) | |
| Close_Circle_Condition | Earlier of (1) Close_Time, and (2) (no two members within 30 ft) OR (manual close by manager) | |
| Delete_Circle_Condition | (delete at TTL) OR (manual delete by manager) | |
| Social_Circle_Manager_User_ID | <pointer to User_ID record of manager's user device> | |
| Rights_Settings_Parameters | Social Circle Manager can add broadcast assets | |
| ... | ... | |

DYNAMIC SOCIAL NETWORK ALLOCATION AND DATA ALLOCATION BASED ON REAL WORLD SOCIAL INTERACTION PATTERNS

BACKGROUND

Online social networks facilitate interactions among users of electronic communication devices, such as computers, smartphones, watches, and other devices capable of communication such as over the Internet. A person might have multiple social associations (family, friends, coworkers, etc.) and manage multiple social networks that the user sets up and coordinates. Managing posts on these social networks can be cumbersome and inefficient.

Social networks often are set up with a person having a social media account inviting others who they know and who have accounts with a particular social network. In such a social network, one user can specify controls on their account so that media that the user posts to their account is visible to anyone or just those other users that have been included in that user's "friends" list. This allows the user to share media about real world experiences with their social circle, which might or might not include those who were with that user for the real world experience, in part, because the friends list is somewhat static and has to be manually maintained.

BRIEF DESCRIPTION OF THE DRAWINGS

Various examples in accordance with the present disclosure will be described with reference to the drawings, in which:

FIG. 5 illustrates an example social circle data record.

DETAILED DESCRIPTION

Figure 1:
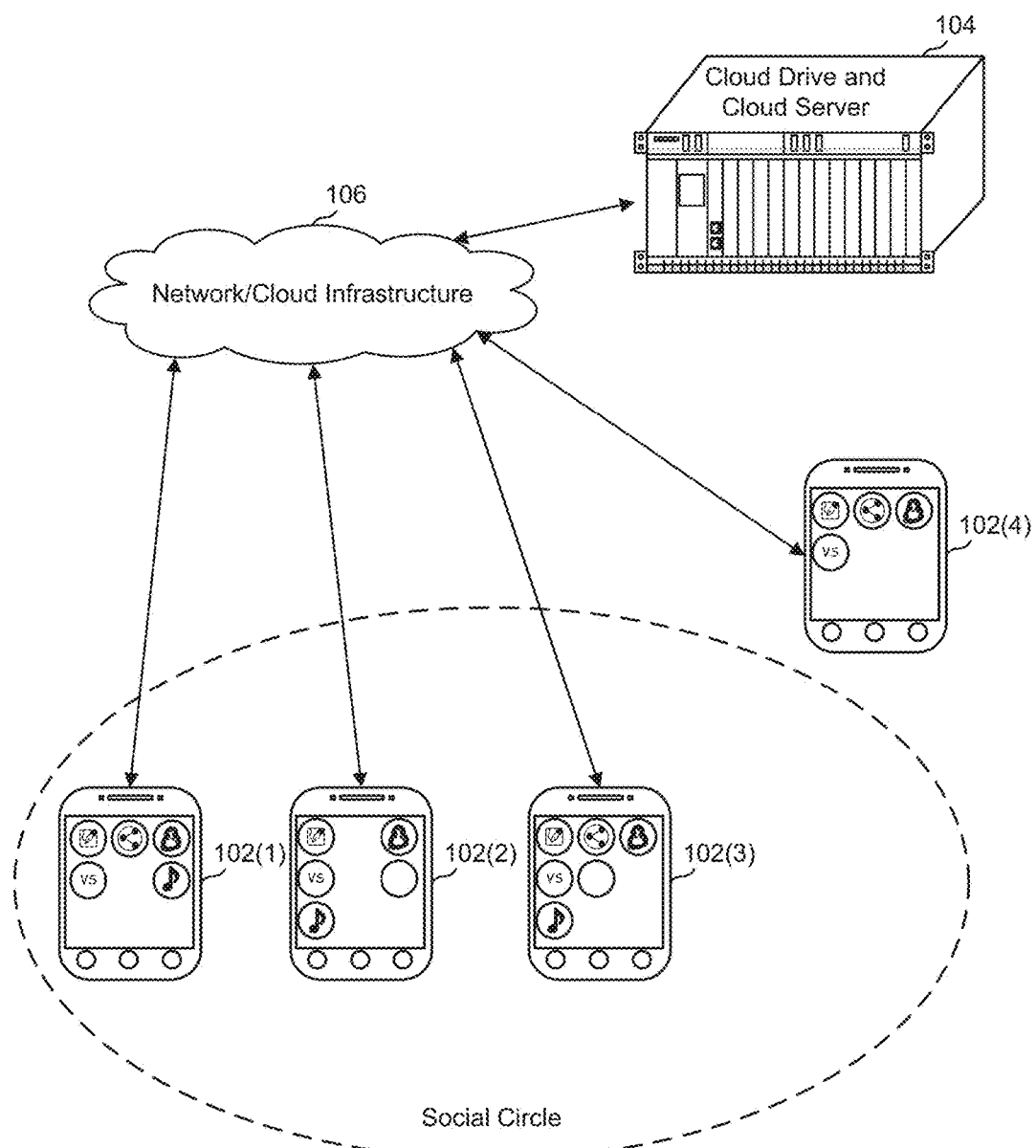
FIG. 1 is a block diagram of a social circle forming environment in which user devices form social circles for sharing assets associated with those social circles.

In the following description, various example implementations will be described. For purposes of explanation, specific configurations and details are set forth in order to provide a thorough understanding of the examples. However, it will also be apparent to one skilled in the art that the implementations may be practiced without the specific details. Furthermore, well-known features may be omitted or simplified in order not to obscure the implementation being described.

In some social networking systems, users statically specify their social networks and the resulting social graphs represent static associations rather than who is in a current setting in the real world, with its expected norms of different social settings. Using the social circle methods and apparatus described herein, social networks are automatically set up and arranged to align with social interactions in real life. A social circle app detects the social group a user is interacting with and serves content that is only relevant within that social group, eliminating any need to micromanage separate and independent social networks.

Techniques described and suggested herein include managing a computing resource that allocates access to assets such as media, information, links, and data that relate to a real world event. A "social circle" is a logical and corresponding data construct representing a set of users (and their user devices) of the participants in that a real world event. The social circle can be dynamic and automatic such that the social circle expands and contracts as people come into the event and leave the event.

A social circle might be formed where some set of users that have some social connection or grouping. Often, a social circle is represented in a database or other data structure, in a centralized computer system, distributed computer system or cloud-based computing resource, as a listing of user names, user accounts, or user identities. Users in a social circle can interact with others in that social circle using user devices that are authenticated as devices associated with those users. The association of users and user devices might be by settings specific to the user device, such as device address. The association of users and user devices might be by user accounts, wherein a user logs into a user account with their particular electronic user device, thereby associating that user device with that user.

A service might be provided to manage the social circles, providing authentication, tracking of which users are part of which social circles and when, the creation, closure, and deletion of social circles, and other aspects. The service might also store content created by or for members of the social circles. The service might be implemented on an Internet-connected cloud server with cloud storage. Alternatively, the data about a social circle and its associated assets might be managed by the user devices in a decentralized manner, which might only require peer-to-peer connections rather than full Internet connections. Those peer-to-peer connections might be intermittent. The service might track the details of a social circle using a social circle data record.

User devices (and by extension, the users of those user devices) become members of a social circle by joining the social circle and those users/user devices may leave the social circle. The social circle data record might specify what is required for a user device to join a social circle and thus become a joined user device. The social circle data record might specify what is required to deem that a joined user device has departed from the social circle and has thus become a departed user device. The social circle data record might specify what is required to deem that a departed user device has rejoined the social circle and has thus again become a joined user device. The social circle data record might specify what is required for the social circle to be closed to further updates. The social circle data record might specify what is required for deleting the social circle data record.

Each of these requirements might be a "condition" expressible in, or by, a computer-readable format, expression, or specific data structure that specifies some criteria for evaluation of whether the condition is met and possibly rules that are part of testing for that condition. For example, a departure condition for a social circle might be such that it is met when a user device does not meet a proximity rule that requires the user device to be within 30 feet of another joined user device that is currently a member of that social circle. A deletion condition for a social circle might be such that the social circle is to be deleted once 24 hours have passed without any posts being made to that social circle. A closing condition for a social circle might be such that the social circle is closed at a time previously specified by a managing user device that has administrative rights over the social circle. Another closing condition for a social circle might be such that the social circle is closed when no pair of user devices in the social circle meets a proximity rule for the event. A departure condition for a social circle might include a simple proximity rule (user devices are joined if they are within 5 feet of another joined user device). A departure condition might require that multiple rules are satisfied, such as a proximity rule and an invite criterion (e.g., the user device must have been invited to join by a managing user device that has administrative rights over the social circle). The administrative rights and the relative rights of non-manager users might be specified in a rights settings parameter field of the social circle data record.

Users with their user devices form social circles and the social circles are coordinated among social circle apps or social circle programs that execute on those user devices. One (or more) of the users might be designated the manager of the social circle, perhaps obtaining that designation by being the first member of a newly formed social circle that the manager formed. The social circle app of the user device of the manager might be configured to be a social circle coordinator system that coordinates other members' social circle app. The configuration might be a setting of an internal flag of the social circle app. In other implementations, the social circle coordinator system is not itself a social circle app, but just does the coordination function. The latter example might be useful for a broadcast type social circle where an operator of a social venue can manage the social circle but does not necessarily participate in the interactions among those present at the event for that social circle but does post broadcast assets.

The user device can be a user device that is associated with a particular person or a user device that joins a social circle and corresponds to a member that is not a person. For example, a social circle might be set up at a concert venue with its members being Alice's user device operated by Alice, Bob's user device operated by Bob, Carol's user device operated by Carol, the venue's user device that executes programmed instructions to make posts and interact with other social circle members, and a media player's user device that executes programmed instructions to post song names, links, and purchasing information to the assets storage for the social circle.

Members of the social circle post data to the social circle. The posted data is referred to as an asset of the social circle. For example, a member of a social circle might be a user device of a user desiring to post an image to the social circle. That user device would then post the image to assets storage and update a social circle data record so that the user devices of other members of the social circle would make their users aware of the post. That image would then be considered an asset of that social circle and an asset reference might be added to a record for that social circle. In some cases, some members of the social circle are broadcasters and other members are listeners, while in other cases, each member is able to post. In some cases, user devices that are members do not normally have a human user associated with them. For example, a music player that operates in the background at a social gathering might play music and post a reference to the assets storage for each song as it is played. An event can be a formal, scheduled event or a less formal activity.

Assets might include digital content, electronic records referencing other content or information, such as messages, images, group photos, videos, online reviews, animations, webpages, and other content. Assets might be information posted by human users that they find interesting and/or worth posting. Assets might be information posted by a computer-implemented user, such as a media server posting information about songs being played. Thus, an asset is representable in some digital form, storable in computer memory, and capable of being conveyed over suitable electronic communication paths.

An asset such as an image might comprise a digital representation needed to generate that image on a suitable display or might comprise a URL that points to a location on the Internet where a copy of that image is electronically stored. Assets might be content created by users in the social circle using their user devices (e.g., a comment, a photo image, a recorded voice), but might also be content created elsewhere (e.g., a prerecorded song, a video created elsewhere, an image obtained from another source, etc.). Assets might possibly subject to distribution constraints, such as a video that is copyrighted by others.

Some assets might be just references or links to other assets/content. For example, where social circle data records are stored in one location in cloud-based storage and the assets are already stored in a second location in cloud-based storage, rather than having copies of the assets in both places, social circle data records in the one location might just include links to the second location where the assets are stored.

Assets might be multi-part electronic objects, such as a movie trailer and a link to a website where users can purchase access to a full-length movie in electronic form. A multi-part electronic object might also include metadata about the content, such as movie names, links, and purchasing information. Assets can also include "control" type assets, wherein the asset is in the form of a control message comprising a set of executable instructions that, when posted by a posting user device of a social circle to a social circle data record for that social circle and received by a receiving user device that is a member of that social circle, would be executed by that receiving user device.

Assets associated with a social circle are made available to user devices that are members of the social circle. In some cases, an asset is selectively available to members based on when their user device became a joined user device and when their user device became a departed user device. In those cases of selective availability, an asset is only available to user devices that were joined user devices at the time the asset was posted (e.g., when the asset was created and/or uploaded). This might be enforced by having the social circle management program check a membership time period parameter for the user devices before determining which assets a user device would be allowed to access. The social circle management program might include a social circle database for storing multiple social circle data records.

Methods and apparatus described herein include computing systems and/or platforms that manage and maintain data about the social circle and its assets, as well as the social circle's creation, its closing for updates, and its deletion. The creation, closing, and deletion can all happen automatically based on predefined conditions represented by computer-readable expressions, but those processes might also be done manually under explicit control of members of the social circle, or by a manager of the social circle. The computing systems and/or platforms might also provide for authentication and access control to manage access to the assets of the social circle to user devices (or users) that are members of the social circle.

A social circle environment can effectively map digital social networking into the real world. For example, attendees at a live music event can share photos and videos with each other via the social circle environment without the need to add others explicitly as friends to their existing social network(s). While the attendees are sharing a real life experience, the social circle environment provides a way for them to interact digitally among themselves. The social circle environment might include a shared cloud drive or other cloud-based storage used by attendees of the event. By becoming part of the music event's social circle, a user can view content that was shared and can add new content to be shared with everyone who is part of that social circle. Users can join a social circle manually by selecting a social circle that a broadcaster is broadcasting (e.g., music event) or automatically based on proximity (and prior familiarity) to other users (e.g., a group of friends grabbing a drink at a bar).

The broadcast social circle might be a social circle set up by a venue operator and might have more controls on who joins the membership and what content can be posted as an asset for that social circle. These controls might be handled by a separate curator system, perhaps operated by venue employees. A broadcast social circle data record and broadcasted assets might be maintained by the curator system. For example, a band playing at a venue might have a user device that joins a social circle and posts digital recordings of their songs, or a selection of their songs, so that they are later available to current members of the social circle at that venue. Such a user device might be unattended.

As used herein, a user is typically a person, but also in some cases might be a business. An example of the latter is where a venue operator is part of a social group that might involve customers of the venue. While it is not impossible for a social circle to be formed that includes users having no computing or communication devices associated with them, a group of people that form a social group typically would each have some sort of user device on them or near them that would interact directly or indirectly with user devices of the other people in the social group, so that those user devices can coordinate to form a social circle data structure that includes references to each of those users by including references to their respective user devices. Thus, if Alice, Bob, and Carol are at a party and create a social circle data structure for their three-person social group, technically that would be a grouping of Alice's user device, Bob's user device, and Carol's user device. However, for readability herein, we say that Alice, Bob, and Carol gathered together for a social event rather than saying that their user devices gathered together.

In a particular implementation, social circles are created manually upon request of one or more users or automatically based on rules about interactions among users. For example, if three friends arrive at a real world social event, such as a dinner party, and they each have a user device such as a smartphone that is programmed to be aware of potential social circle formation, those users' devices might form a social circle that persists for as long as those partygoers are in proximity. As content is created, it is shared among the social circle.

It may be that one of the user devices is considered the originator of the social circle. For example, the user device of the party host might be the originator of the social circle, whether it was created manually by the party host or formed automatically when the party host's user device detected other user devices that satisfied a social circle creation condition. However, this is not required and a group of user devices can, by some consensus, decide to originate a social circle as a group. In a specific variation, the cloud server acts as a user device of a member of the social circle and the cloud server is programmed to, or runs software to, monitor user devices and originate a social circle if the cloud server detects that a social circle creation condition is satisfied. The social circle creation condition could be simple or complex. A simple example is a social circle creation condition that is met when two or more user devices that are running the social circle app convey their locations to the cloud server, those locations are within a given radius, and the users are mutually acquainted. Mutual acquaintance might be determined by the cloud server by querying address books of the respective user devices with user consent previously provided. Thus, a social circle can form when three mutual friends get together without requiring any action by those friends upon getting together.

As used herein, an "event" refers to some formal or informal event, occurrence, or activity where multiple people join together for a shared experience that has a beginning time, an ending time, and some electronic interaction. The event might have a fixed physical location, such as a concert at a concert arena, a meal at a restaurant, or a party at a residence, but might have a varying physical location, such as a hike, marathon run, or train ride. The event might have a "start condition" the occurrence of which is deemed the start of the event. This can be a prescheduled time of day (e.g., 1:30 PM) or based on something occurring (e.g., two or more participants are within talking distance of each other). The electronic interaction might be the taking of photos and sharing them, the selection of a movie, song, multimedia, or the like, or the sharing of online reviews, web pages, etc. Typically, an electronic interaction can be represented by some asset, such as a stored media file, a URL to some resource, or an entry in a database. Often, these electronic interactions have an identified time. As an example, a group photo taken with one participant's camera phone might have an identified time when the photo was taken or when the photo was shared with the social circle. An identified time of a song that was played at a party might be the time the song was selected or played. An identified time of a URL might be the time that the URL was shared among those in the social circle.

FIG. 1 is a block diagram of a social circle forming environment in which user devices form social circles for sharing assets associated with those social circles. In this example, a social circle has already been formed and includes user devices 102(1), 102(2), and 102(3), but not user device 102(4). A record of the details of the social circle is in a social circle data record (not shown) that might be stored on a cloud server 104 that each of the user devices 102 can access via a network/cloud infrastructure 106. Cloud server 104 might be a server set up just to manage social circles, or might be part of a more general-purpose cloud service.

As explained in more detail below, a social circle data record might define or specify details of the social circle, such as a name for the social circle, who is a member of the social circle (or which user devices are members of the social circle), and what the conditions are that need to be met for candidate member arrival, member admission, member departure. For example, a social circle data record might specify, in a format that a computer process can easily parse and interpret, a candidate member arrival condition (e.g., "a new user device is detected that satisfies a proximity condition"), a member admission condition (e.g., "any new user device that arrives can be a member if the user device indicates that the user has accepted membership in the social circle" or "a new user device that arrives can be a member if the manager accepts that user's candidacy"), and/or a member departure condition (e.g., "a user device is deemed to have departed if it is further than 30 feet from any other user device in the social circle").

The social circle data record for a social circle of an event might also include references, for each member of the social circle, to joining times and departure times when that member's user device is deemed to have arrived at the event and joined the social circle and when that member's user device is deemed to have departed from the event. These times might be recorded as a membership time period record for that user device. Arrival/joining might be determined using a joining condition and departure might be determined using a departure condition. A joining condition might be a computer-readable expression of what constitutes joining. Joining might occur as soon as arrival is detected, or shortly thereafter, without other requirements. However, in some social circles, there might be additional conditions to be met beyond mere presence in a location, such as an additional, invitation condition that the user associated with the arriving user device be invited by one or more of gatekeeping user device.

Depending on rights settings parameters or other configuration details, the gatekeeping user device(s) might be just the user device of a host of the social circle, the user devices of some subset of members in the social circle, or the user devices of all of the members of the social circle. This would allow for social circle invitations to be controlled by one person, by partial voting or consensus of multiple people, or by voting or consensus of all currently joined members of the social circle.

The joining conditions and/or departure conditions might be represented electronically in the social circle data record as computer-readable expressions. The social circle data record might also define the conditions to be met for operations relating to assets, such as asset posting conditions, asset modification conditions, and asset deletion conditions. In addition to conditions that apply to assets, the social circle data record might also include conditions that apply to the social circle itself, such as social circle creation conditions, social circle closing conditions, and social circle deletion conditions. For example, a joining condition might be represented by the expression ((DISTANCE(USER_DEVICE(USER_A),USER_DEVICE(USER_HOST)).LTE. THRESHOLD( )) && ON_INVITE_LIST(USER_HOST, USER_A)) which might translate to "if the distance from User A's device to the host's device is less than or equal to a threshold distance and User A is the host's invite list, then User A's user device can be joined to the social circle." Another example is the joining condition represented by the expression (ACCEPTED(USER_DEVICE(USER_A)), which might translate to "if User A signaled an acceptance of an invite, then User A's user device can be joined to the social circle."

Social circles can be easily formed as user devices of attendees to a social event join the social event. For example, suppose a group of partygoers arrive at a party with their user devices (smartphones, tablets, watches, wearable computers, or other computing/communicating devices) and those user devices have a social circle app running. Some devices might have a separate social circle app, but other devices might have that feature as a core application or feature. If a user device of a partygoer detects the presence of user devices of other partygoers, it might negotiate to create a social circle once two of the partygoers arrive, then join additional social circle members automatically as additional partygoers arrive with their user devices appropriately configured. Those partygoers might use their user devices to create, identify, or reference media or other assets and logically add those assets to the social circle so that those assets are accessible to other members of the social circle. Some social circles might be curated in that some member of the social group, the manager of the social circle, decides which user devices will join the social circle. In such cases, there might be a detected set of candidate user devices and a smaller set of member user devices for which the manager has signaled to the manager user device an acceptance of entry for those accepted members.

Figure 2:
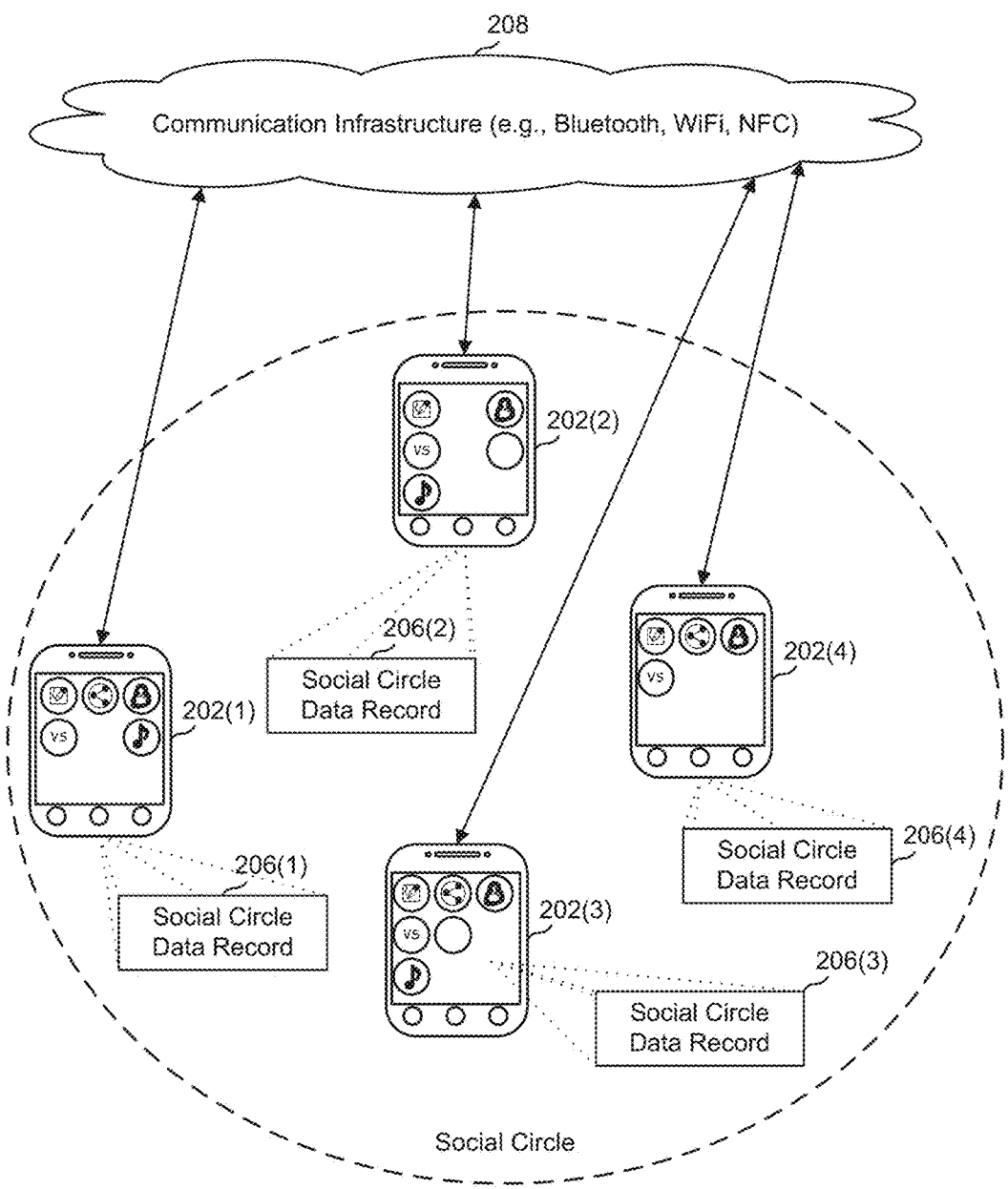
FIG. 2 is a block diagram of a social circle forming environment among peer devices.

FIG. 2 is a block diagram of a social circle forming environment among peer devices. As with the social circle forming environment of FIG. 1, user devices form social circles for sharing assets associated with those social circles. In this example of FIG. 2, a social circle has already been formed and includes user devices 202(1), 202(2), 202(3), and 202(4). A central repository is not needed to store a record of the details of the social circle. Instead, a social circle data record 206 is created and managed by each of the user devices in a distributed fashion (shown as social circle data records 206(1), 206(2), 206(3), and 206(4)). Alternatively, the social circle might be managed at one of the user devices, such as user device 202(4) and other user devices would refer to that user device 202(4) as needed. A communication infrastructure 208, such as the Internet or a peer-to-peer network, is used for communication among the user devices.

In this example, there need not be a remote online portion of the environment. For example, communication infrastructure 208 might be implemented using Bluetooth™ communications, Wi-Fi communications, NFC, or the like. Thus, if four people where hiking in an area with no Internet or cellular connectivity, they could still form a social circle and create and share assets that are created or available on their user devices. The operations that might have otherwise been done by a centralized process, such as managing the social circle data record, the list of assets, and storing and serving the assets to social circle members, might be done in a distributed fashion where multiple user devices provide some part of those operations and/or in a redundant fashion where more than one user device (and maybe all of the user devices) can perform all of the needed management functions.

A hybrid approach might be used. In a hybrid approach, each user device has the complete social circle data record, lists of assets, and some metadata on those assets, such as thumbnail images, while each user device does not necessarily have a local copy of all of the assets. As an example, each user device in a peer-to-peer social circle might be able to present its user with details about the social circle, such as who the members are, and what assets might have been shared in the social circle, but the assets themselves, such as images, video, or music, would be present only on the user device of the social circle member who first posted the asset, until another user expressly requests a transfer or a stream of that asset. With this hybrid approach, users can fully interact with their social circle even if communication is not available at that moment.

Figure 3:
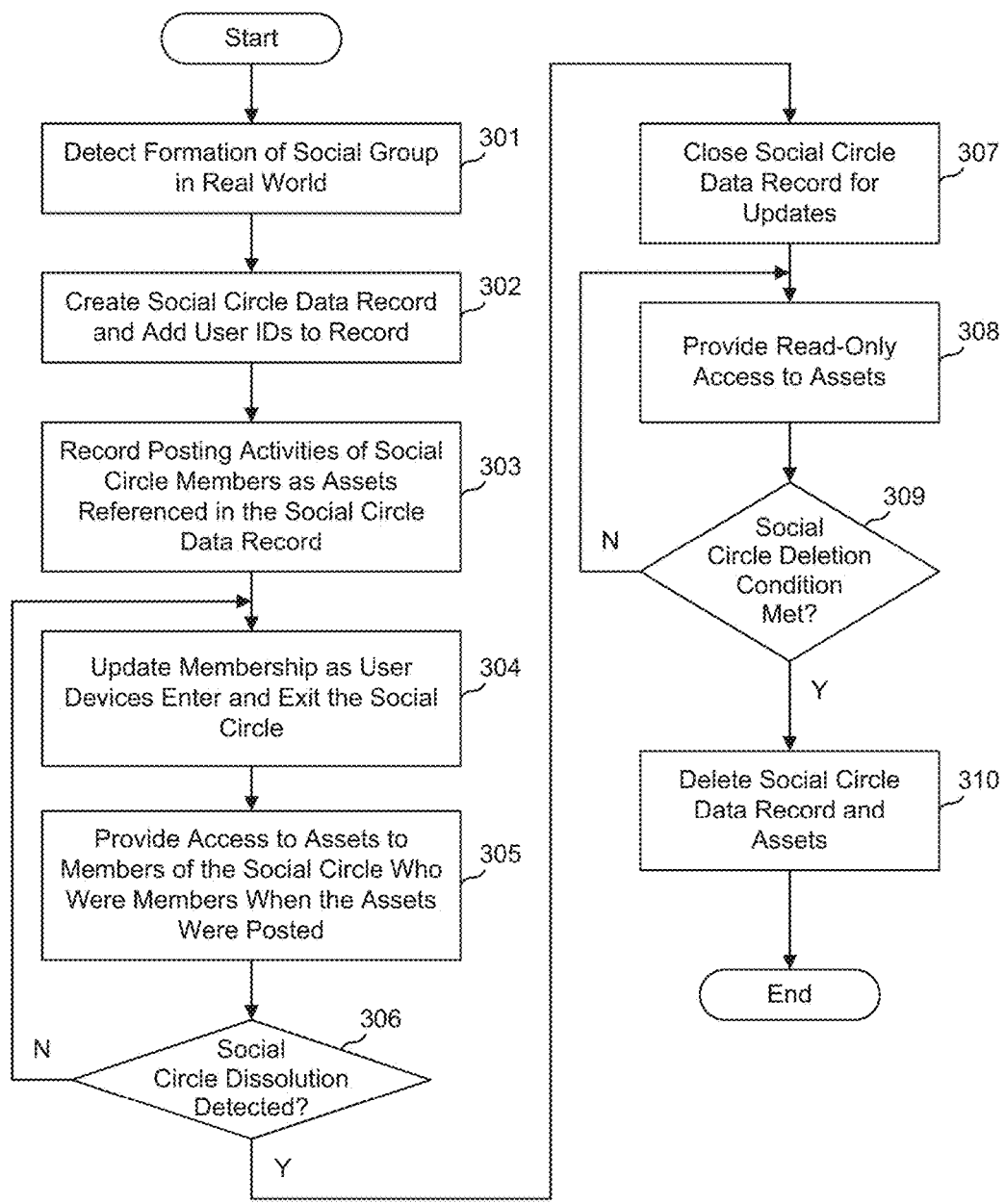
FIG. 3 is a flowchart of a process of creating, closing, and deleting social circles.

FIG. 3 is a flowchart of a process of creating, closing, and deleting social circles. This process might be performed centrally, by a social circle coordinator, or distributed among peers. A social circle coordinator system might simply be one of the peers, such as the peer that initiates a process of forming a social circle when certain conditions are met, such as two or more user devices being within some spatial region.

As one example, a social circle might be created when a social circle app user is within "reach" of another social circle app user. Based on the relationship between the two users, the social circle might be marked by the relationship they have with the other person. For example: when at home, a social circle is shared by family members, marked as "family", and not automatically provided to others who might be in the house who are just visiting. In a workplace, a social circle might be shared with coworkers, marked as "Work", and not shared with visitors.

At step 301, the coordinator detects formation of a social group in a real world environment. Examples of this detection are described in more detail elsewhere herein, but might be two friends meeting at a venue with their respective user devices running a social circle app. One of the user devices can be the coordinator of the social group. The coordinator of the social group might have functions that other user devices do not, such as the ability to manage the social group membership, but that need not be the case. In some cases, the coordinator has the same rights as all other users in the membership, but is referred to as the coordinator because that user device's social circle app allocates the cloud storage or other storage for the social circle data record and assets. In some cases, a cloud server or an online remote process is a user device and creates the social circle.

The borders of what constitutes a social group can be defined in a number of ways. One way is purely geographical and absolute. For example, a social group is deemed to exist and its corresponding social circle might be created when any user that has a user device running the social circle app is inside a given restaurant with another user also having a user device running the social circle app. The borders might be geographical and relative, such as where a social group is deemed to exist (and its corresponding social circle created) when any user that has a user device running the social circle app is within five feet of another user device also running the social circle app. The borders might be defined by contact lists as well, such as where a user device has a contacts list that references other user devices (by telephone number, social circle system identifier, or any other identifier) or has a list of prior social circle formations and their members. Distance might be asymmetrically horizontal, so that two user devices that are at the same altitude but 15 feet apart are considered closer together than two user devices that are at the same X and Y coordinates, but one is 10 feet above the other, which would include two people in the same room, but exclude people separated by a floor.

As used herein, a social group is "deemed" to exist when certain predefined conditions are met even when a social group might not actually exist in the real world. For example, suppose Alice and Bob are friends who carry their smartphones and both have the social circle app running suppose further that Alice, Bob, Carol, and others got together at a music festival as group and there formed a social circle, posting pictures, comments, URLs, and other assets. When they each went their separate ways, the social circle was closed for updates, and perhaps since deleted. Then, the next day, Alice and Bob are within ten feet of each other in the same restaurant, but neither of them knows they are in the same restaurant. In that situation, clearly Alice and Bob have not formed a social group. But their respective user devices might have as a social circle creation condition "when I am within 30 feet of someone who I have formed social circles with in the past, assume that it is because I am socially engaged with that someone and attempt to create a social circle." In that case, their user devices would deem that a social group exists when in fact it does not. It is not normally a problem if the social circle app determines incorrectly that a social group exists when one does not.

Referring again to FIG. 3, at step 302, the social circle coordinator (which might be one user device's social circle app) creates a social circle data record and adds user IDs to the social circle data record of those user devices that meet the joining conditions (corresponding to those users who are deemed to be in the detected social group). At step 303, the social circle coordinator, or other members where that is permitted, posts assets to the social circle by recording the post to the social circle data record's listing of assets. For example, a social circle member might post a reference to a song, a recipe, a restaurant review, or other asset. Those assets are referenced in the social circle data record. In some cases, content is posted programmatically. The users are represented by their user devices, such as their smartphones, smart watches, or other communicating devices. So, if a smartphone owner leaves their smartphone in range of a detected social group, that user would be deemed to be still with the social group even though the user had in fact left the area. Some users or members of a social circle are automated processes, such as a cloud server, a media server, or the like. In those cases, those automated processes would have user IDs that can be added to the social circle data record in the same way as user IDs of user devices owned and/or operated by actual human users.

At step 304, the social circle coordinator system updates membership in the social circle data record as users enter and exit the social group, which is detected as user devices meet the conditions for joining ("joining conditions") and meet the conditions for leaving ("departure conditions"). The social circle coordinator system provides, at step 305, access to the assets so that members of the group have access to what was posted by other members of the group. If more than one social circle is active at a time for a user, a dialog can be presented to allow the user to select the social circle in which to post assets.

Until the social group dissolves, the social circle coordinator continues to update membership and accept new or updated content (representing by the arrow that forms a loop of steps 304, 305, and 306). A social circle closing condition, which can be specified in the social circle data record, might be "when no two members of the social circle are within 10 feet of each other, close the social circle," or "at the scheduled ending time of the party, close the social circle."

If at step 306, a social circle closing condition is met (representing the dissolution of the social group), the social circle data record still exists, but the social circle coordinator system closes the social circle data record to further updates to the assets associated with the social circle (step 307). At step 308, the social circle coordinator considers a social circle deletion condition and either continues to allow read-only access to assets of the social circle, or deletes the social circle (step 310). Deletion of the social circle might be the deletion of the social circle data record, or the marking of it so that other users do not have access to the assets. Of course, where the assets exist elsewhere, those assets are still available after deletion of the social circle, but just not via that social circle data record.

Figure 4:
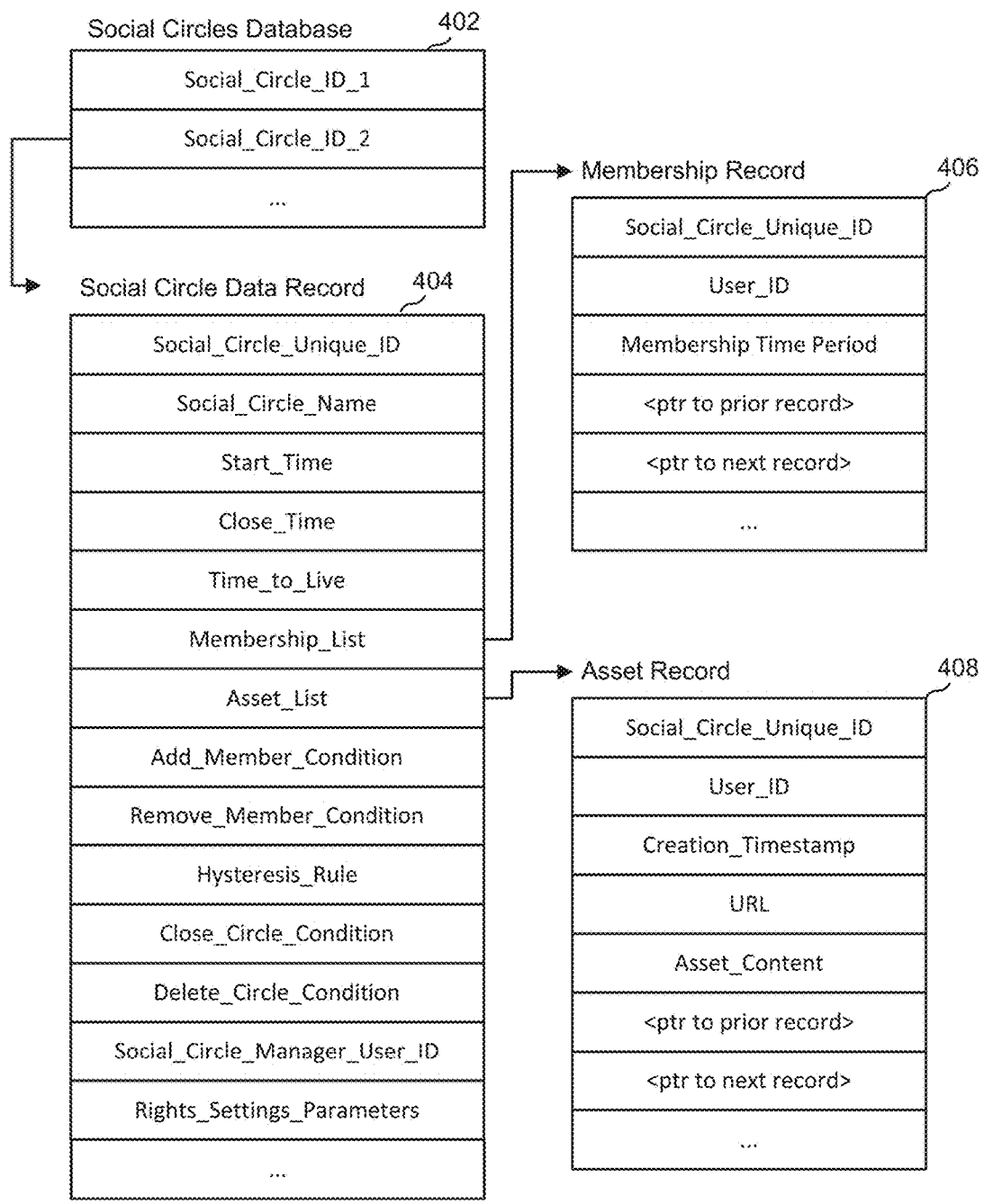
FIG. 4 illustrates example data structures that might be used to support social circle interactions.

FIG. 4 illustrates example data structures that might be used to support social circle interactions. A social circles database 402 might contain multiple social circle data records or their identifiers, such as Social_Circle_ID_1 and Social_Circle_ID_2. Social circles database 420 might be stored on a cloud drive accessible to those with proper authority. Each record of social circles database 420 might be a social circle data record such as a social circle data record 404, or records in social circles database 420 might be references to social circle data records stored elsewhere.

As illustrated, social circle data record 404 has a number of fields relating to the social circle represented by that data record. Social_Circle_Unique_ID allows social group apps to uniquely reference the represented social circle. Social_Circle_Name might provide a user-friendly name for the social circle. Start_Time, Close_Time, and Time_to_Live indicate when the social circle started, closed for updating, and when it will expire, respectively. Social circle data record 404 includes lists of members (Membership_List) and assets (Asset_List), which might be stored as lists or as references to lists stored elsewhere.

Social circle data record 404 also includes expressions for conditions to be met for taking certain actions, such as a joining expression representing a joining condition, Add_Member_Condition. The joining expression would be used by a social circle coordinator to determine whether to have a user join the social circle as a member. Another expression is a departure expression representing a departure condition, Remove_Member_Condition, that the social circle coordinator uses to determine whether to remove a member. Yet another expression is a social circle deletion expression representing a social circle deletion condition, Delete_Circle_Condition, that the social circle coordinator uses to determine when to delete a social circle. Another expression that might be used is a hysteresis expression representing a hysteresis rule, Hysteresis_Rule, that the social circle coordinator uses to determine whether to defer adding/removing a member so as to avoid unnecessary membership changes in border cases. A social circle closing expression representing a social circle closing condition, Close_Circle_Condition, might be used by the social circle coordinator to determine when to close the social circle for further updating (in effect making the social circle read-only until it is deleted).

Where there is a social circle manager user device, a user device having greater rights to control the social circle than other user devices, there is the Social_Circle_Manager_User_ID field to identify the social circle manager. A Rights_Settings_Parameters field might identify who has what rights, such as the rights to post assets, add others, delete others, and the like.

The Membership_List field might be a pointer to a first membership record in a membership table. As illustrated, a membership record 406 includes fields for a social circle identifier, a user identifier, a membership time period (which might be multiple noncontiguous time periods), and pointers to the next and previous records.

The Asset_List field might be a pointer to a first asset record in an asset table. As illustrated, an asset record 408 includes fields for a social circle identifier, a user identifier (of the user who added the asset to the list), a creation timestamp (which can be used as a filter on access so that members who were away from the social group at the time would not see that particular asset), and perhaps a URL that points to content. In some cases, the content is stored directly in the record. Asset record 408 also includes pointers to the next and previous records.

FIG. 5 illustrates an example social circle data record 502. This is a specific example for illustration purposes. Other variations should be apparent upon reading this disclosure. This data record can be in a database format, text format (structured or unstructured), in a key=value pair listing, extendible markup language ("XML"), or other form.

In this specific example, social circle data record 502 (and by extension the social circle that it represents) is uniquely identified with Social_Circle_Unique_ID=20150301ABC and would be displayed to users in an informative way as "Dinner Meeting, March 1." In this example, social circle data record 502 was created on Mar. 1, 2015 at 7 PM and can be updated by members until Mar. 2, 2015 at 12:32 AM (Close_Time=20150302.0032). Social circle data record 502 is scheduled to be deleted Apr. 30, 2015 at 8 PM (Time_to_Live=20150430.2000).

Social circle data record 502 indicates that the social circle coordinator should add user devices as members of social circle 20150301ABC when a nonmember user device belongs to a user who is on a guest list and is within ten feet of a present member of social circle 20150301ABC. Social circle data record 502 indicates that the social circle coordinator should remove user devices as members of social circle 20150301ABC when a member user device stops being within 30 feet of any other present member and a hysteresis rule is met, if there is one. For example, the hysteresis rule here is that status of a user device should not change if it has already changed in the past 15 minutes. This would deal with the case where a user device bounces between 29.9 to 30.1 feet based on minor movements of a user at a boundary. Social circle data record 502 will be deleted, or rendered inaccessible to the users in the social group, at the scheduled deletion time or when manually deleted by a manager. The manager is often the user in possession of the user device that is running the social circle app as the social circle coordinator, but that need not be the case always.

Social circle data record 502 indicates that the social circle coordinator should close social circle 20150301ABC for updating at the specified close time or earlier if each member becomes separated from all other members by 30 feet, or if the manager manually closes the social circle. Proximity could be determined in a number of ways, such as GPS, cell tower triangulation, signal detection, Bluetooth™ signals, or other known proximity measuring techniques. Social circle data record 502 might have a field for a proximity condition (not shown), and the social circle app might have stored a general proximity condition applies to all social circles or as a default for those social circles that do not have their own proximity rules. Example proximity rules include "devices are in proximity if they can detect each other using Bluetooth™ communications" or "devices are in proximity if they can detect that they are closer than five feet to each other."

Social circle data record 502 includes a field to indicate the manager of the social circle, Social_Circle_Manager_User_ID. This ID can be a user device of a human user, but might be the ID of a cloud server process that created the social circle in response to some social circle creation condition that the cloud server process determined was satisfied. Examples of manager function include creating a social circle, closing a social circle, deleting a social circle, removing members, adding members, inviting members, and other functions a manager might perform. In some social circles, the manager function might be distributed. For example, in a social circle of five user devices, a manager function is performed when three of the five user devices agree to perform that function. In such a social circle, any three users can trigger an invitation to a new user or a joining of that new user to the social circle. Other voting schemes might be used, such as where any two users acting in concert in any size social circle can perform a manager function if no other users object within some time window.

Figure 6:
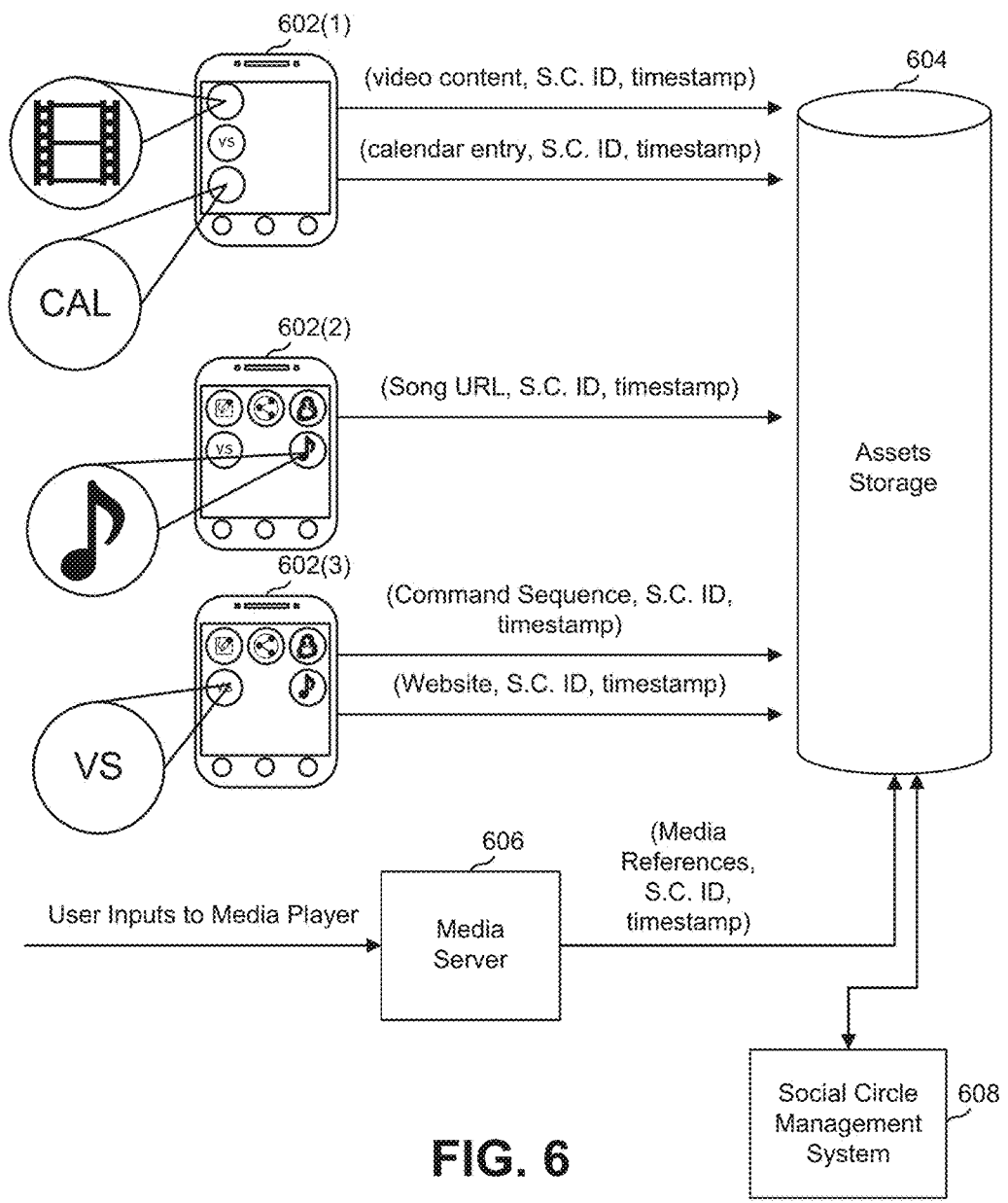
FIG. 6 illustrates a block diagram of social circle forming environment in which references to assets are created.

FIG. 6 illustrates a block diagram of social circle forming environment in which references to assets are created. As shown there, three user devices 602(1), 602(2), and 602(3) are shown, each having various apps installed (as represented by icons on a home screen). In these examples, the social circle app is indicated by the icon "VS". Content from various apps is tagged by the user and provided to the social circle app or is provided by the social circle app directly.

For example, the user of user device 602(1) selects a video from that user's video library and uses the social circle app to post the video, sending that video (or a reference to the video) to assets storage 604 for viewing by other members of the social circle. The posting might be the content, the social circle identifier and a timestamp corresponding to a receipt time of the posted asset. Other variations are possible. In another example, the user of user device 602(1) selects a calendar entry, which other members can access and add to their calendar. Likewise, the user of user device 602(2) posts a song. The user of user device 602(3) posts a website URL and also posts, using the social circle app or otherwise, a command sequence. Command sequences are explained in more detail below with reference to FIG. 8.

A media server 606 might also be configured to be in the role of a user device and understand how to post references to songs selected and played, along with their played time. A separate social circle management system 608 might include a social circle management program and a social circle database provided for more complex asset management, perhaps by a nonparticipant in the social interaction. As explained above, various user devices can post content or references to content, thus providing it to other members of a social group where the social circle for that group was created as the group came together and gets fixed in place as that social group dissolves, eventually being deleted.

Figure 7:
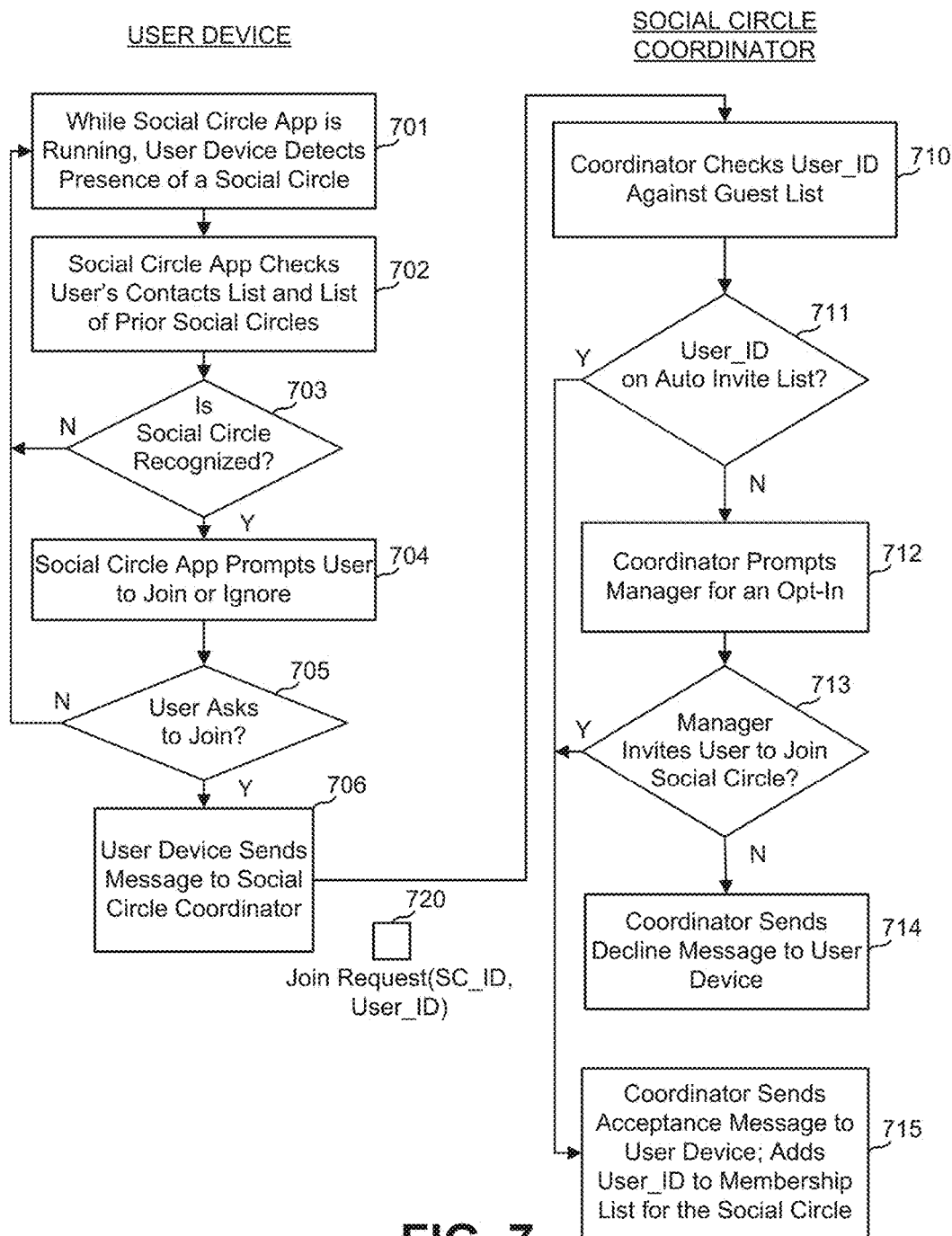
FIG. 7 is a diagram illustrating actions taken by a user device and a social circle coordinator when joining a social circle.

FIG. 7 is a diagram illustrating actions taken by a user device and a social circle coordinator when joining a social circle. In that process, starting with step 701, while a social circle app is running on a user device, it detects presence of a social circle. This might be as simple as detecting another user device within some threshold distance, or might be detecting that the user device has arrived at a particular location. If the social circle app detects presence of a social circle, it might issue an invitation message to the user of the user device running the social circle app.

At step 702, the social circle app checks the user's contacts list and list of prior social circles and if the social circle detected is not recognized, at step 703, the social circle app ignores it and continues back at step 701 until another social circle is detected. If the social circle is recognized, the social circle app prompts the user to join the social circle or ignore it (steps 704) and if the user asks to join (step 705), the user device sends a message 720 to the social circle coordinator, which is identified as part of the social circle. Otherwise, the social circle app continues back at step 701 until another social circle is detected.

Once the social circle coordinator receives message 720 (step 710), the social circle coordinator checks the User_ID of message 720 against a guest list and if the User_ID is on the guest list (step 711), flow continues at step 715. Otherwise, the social circle coordinator prompts the manager of the social circle to accept or decline the request from the user (step 712). If the manager declines to invite the user (step 713), the social circle coordinator sends a decline message to the user (step 714). However, if the manager accepts, then the social circle coordinator sends an acceptance message to the user and adds the User_ID to the membership list for the social circle (step 715). In some variations, manager approval is not required. Manager functions might be by consensus of multiple user devices. In such cases, the manager approval process might comprise a majority of the user devices approving the new member, any one of the user devices approving the new member, or approval being based on some voting protocol.

Figure 8:
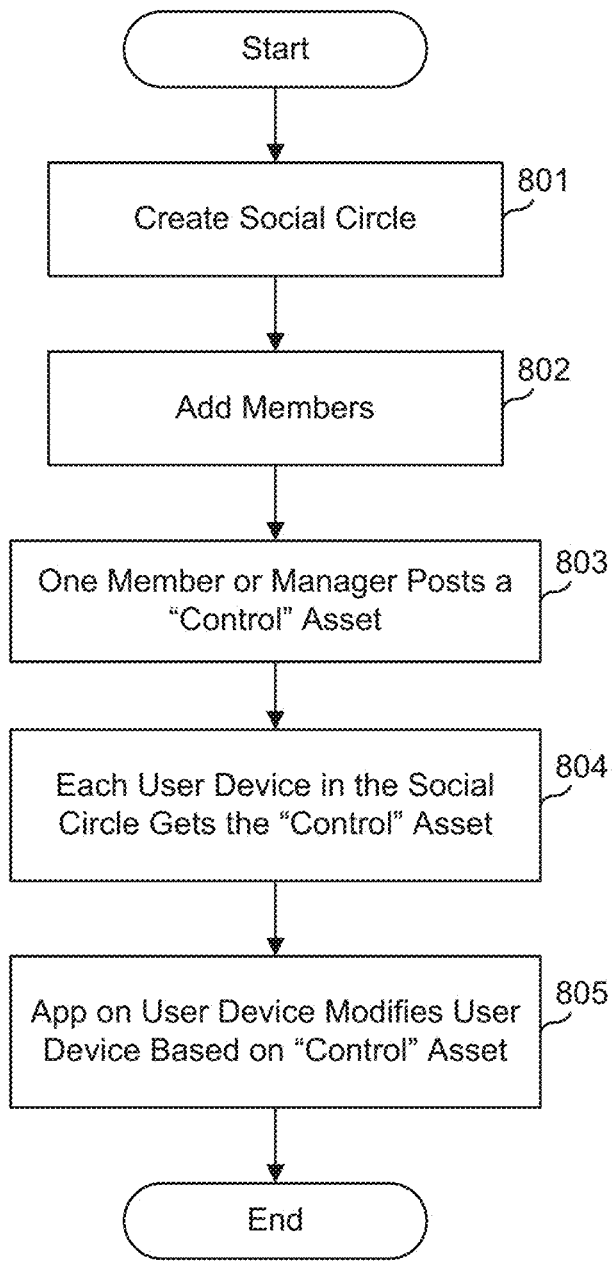
FIG. 8 is a flowchart of a process of group control of user devices of a social circle.

FIG. 8 is a flowchart of a process of group control of user devices of a social circle. Group control has many uses. For example, where a social circle is automatically created by proximity for family members, one family member could post a "control" type asset, such as a command sequence representing a command to turn all user devices into silent or "airline" mode at the start of family dinnertime. Other user devices would see the command sequence that was posted and act on it, so that all user devices in that social circle would be turned off at that time.

In the process illustrated in FIG. 8, a user device creates a social circle (step 801), if not already created, and then add members (step 802) based on which user devices are detected. One member of the social circle, or a manager of the social circle, posts a "control" asset (step 803). Since each user device in the social circle is provided access to the assets, they all get the "control" asset (step 804). The social circle app on each user device modifies that user device based on "control" asset (step 805).

Figure 9:
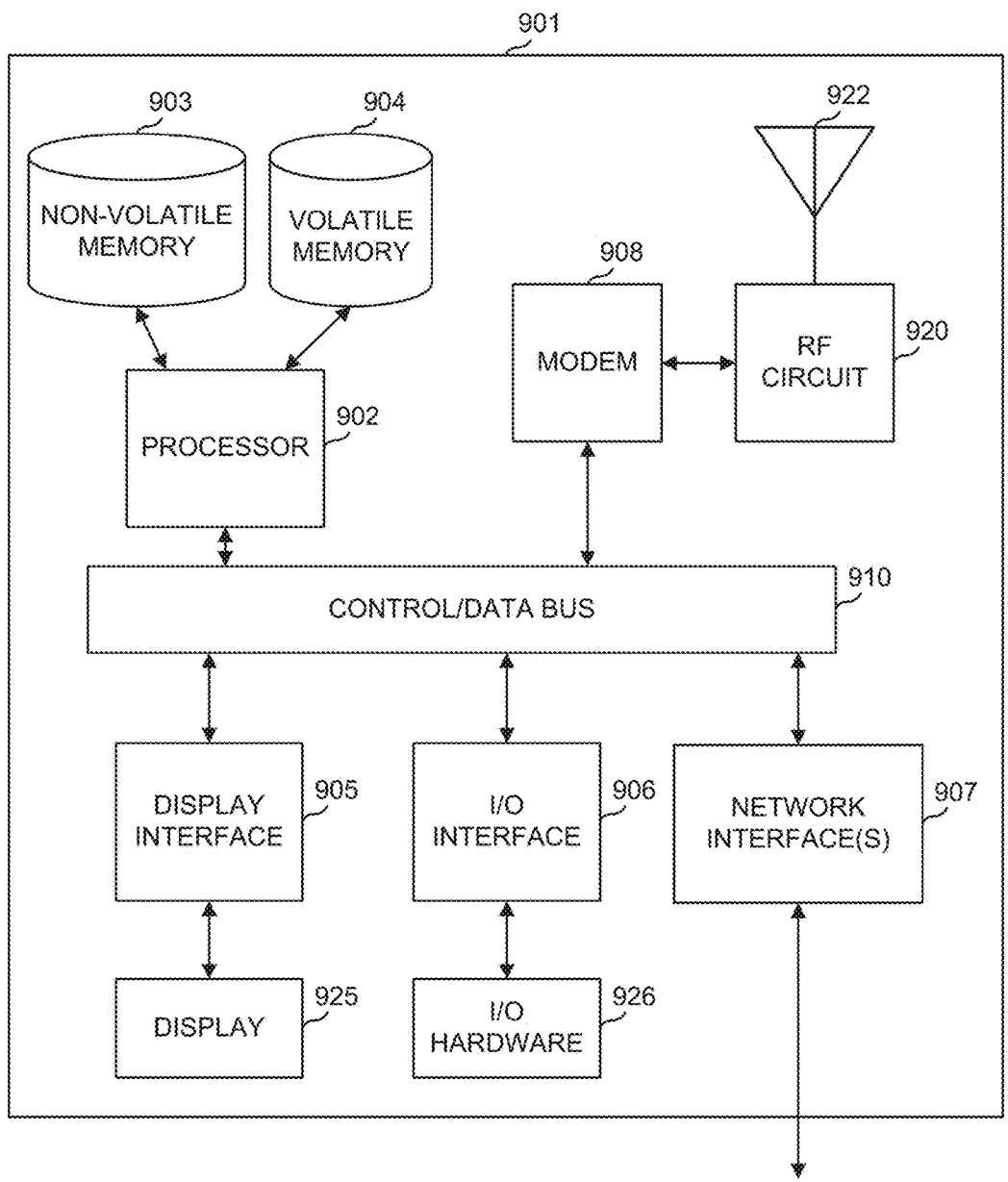
FIG. 9 is a block diagram of computing hardware as might be used in a user device.

FIG. 9 is a block diagram of computing hardware as might be used in a user device, such as user devices 102 shown in FIG. 1. Computing hardware 901 in FIG. 9 is shown comprising a processor 902, non-volatile memory 903, volatile memory 904, a display interface 905, an input/output ("I/O") interface 906, and network interface(s) 907. Each of these components can communicate via a control/data bus 910. Network interface(s) 907 might include Ethernet, USB, wireless, or other interconnections. Display interface 905 is coupled to a display 925 and I/O interface 906 is coupled to I/O hardware 926. Wireless communication might be handled by a modem 908, radio frequency circuit 920, and antenna 922. Other elements, such as power supplies and power connections might be present although not shown. Examples of computing hardware might include electronic book reading devices, smartphones, tablet computers, or the like and might include other subsystems not shown in FIG. 9. Other electronic elements might be present for use in proximity detection and location detection.

Processor 902 may be configured to access memory and execute computer-executable instructions loaded therein. For example, the processor 902 may be configured to execute computer-executable instructions of various program modules to cause or facilitate various operations to be performed in accordance with one or more embodiments of this disclosure, such as the social circle app referenced above. Processor 902 may include any suitable processing unit capable of accepting data as input, processing the input data in accordance with stored computer-executable instructions, and generating output data. Processor 902 may include any type of suitable processing unit including, but not limited to, a central processing unit, a microprocessor, a Reduced Instruction Set Computer ("RISC") microprocessor, a Complex Instruction Set Computer ("CISC") microprocessor, a microcontroller, an Application Specific Integrated Circuit ("ASIC"), a Field-Programmable Gate Array ("FPGA"), a System-on-a-Chip ("SoC"), a digital signal processor ("DSP"), and so forth. Further, processor 902 may have any suitable microarchitecture design that includes any number of constituent components such as, for example, registers, multiplexers, arithmetic logic units, cache controllers for controlling read/write operations to cache memory, branch predictors, or the like. The microarchitecture design of processor 902 may be capable of supporting any of a variety of instruction sets.

Non-volatile memory 903 may include read-only memory ("ROM"), flash memory, ferroelectric RAM ("FRAM"), various types of unalterable ROM, and/or writeable variants of ROM such as electrically erasable programmable read-only memory ("EEPROM"), and so forth. Non-volatile memory 903 may include removable storage and/or non-removable storage including, but not limited to, magnetic storage, optical disk storage, and/or tape storage. Non-volatile memory 903 may provide non-volatile storage of computer-executable instructions and other data. Non-volatile memory 903, removable and/or non-removable, is an example of computer-readable storage media ("CRSM") as that term is used herein.

Non-volatile memory 903 may store computer-executable code, instructions, or the like executable by processor 902 to cause processor 902 to perform or initiate various operations. Moreover, output data generated as a result of execution of the computer-executable instructions by processor 902 may be stored in non-volatile memory 903. Non-volatile memory 903 may store one or more operating systems ("O/S"), one or more database management systems ("DBMS"), and program modules, applications, or the like. Any of the program modules may include one or more sub-modules.

Volatile memory 904 may include random access memory ("RAM"), static random access memory ("SRAM"), various types of dynamic random access memory ("DRAM"), and so forth. Volatile memory 904 may include main memory as well as various forms of cache memory such as instruction cache(s), data cache(s), translation lookaside buffer(s) ("TLBs"), and so forth. Further, cache memory such as a data cache may be a multi-level cache organized as a hierarchy of one or more cache levels (L1, L2, etc.). Volatile memory 904 is an example of computer-readable storage media ("CRSM") as that term is used herein.

Using at least one network interface, the user device can communicate with a cloud drive and other user devices. Network interface(s) 907 might also allow processor 902 to send and receive data from networked resources, such as servers, clients, devices, etc. that are able to communicate over cable networks, public networks (e.g., the Internet), private networks (e.g., frame-relay networks), wireless networks, cellular networks, telephone networks (e.g., a public switched telephone network), or any other suitable private or public packet-switched or circuit-switched networks. In addition, network interface(s) 907 might be used for communication using associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial ("HFC") medium, a microwave medium, a radio frequency communication medium, a satellite communication medium, or any combination thereof.

Control/data bus 910 may include at least one of a system bus, a memory bus, an address bus, or a message bus, and may permit exchange of information between various components of the computing hardware 901. Control/data bus 910 may include, without limitation, a memory bus or a memory controller, a peripheral bus, an accelerated graphics port, and so forth. Control/data bus 910 may be associated with any suitable bus architecture including, without limitation, an Industry Standard Architecture ("ISA"), a Micro Type Architecture ("MCA"), an Enhanced ISA ("EISA"), a Video Electronics Standards Association ("VESA") architecture, an Accelerated Graphics Port ("AGP") architecture, a Peripheral Component Interconnects ("PCI") architecture, a PCI-Express architecture, a Universal Serial Bus ("USB") architecture, and so forth.

Figure 10:
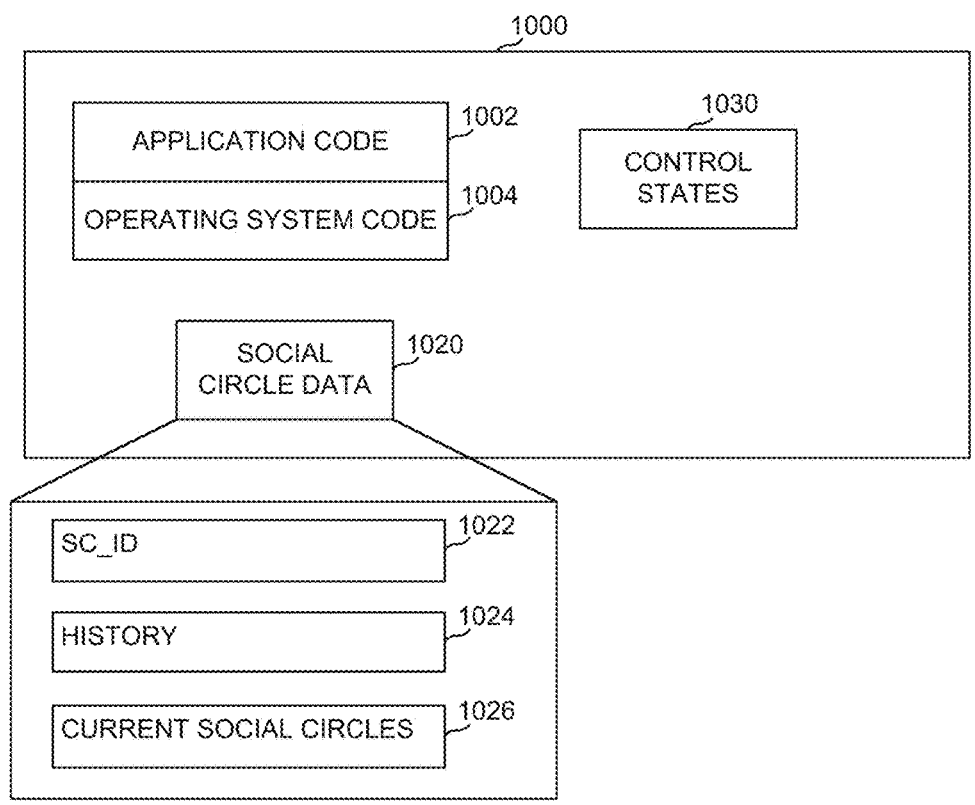
FIG. 10 is a block diagram of memory structures of a user device.

FIG. 10 is a block diagram of memory structures 1000 of a user device. Memory structures 1000 might include non-volatile memory storage for application code 1002, operating system code 1004, social circle data 1020, and various control state and other variable storage 1030. In this example, social circle data 1020 includes listings of one or more social circle identifiers 1022, history of prior social circle joins and occurrences 1024, and status data 1026 for currently active social circles.

Figure 11:
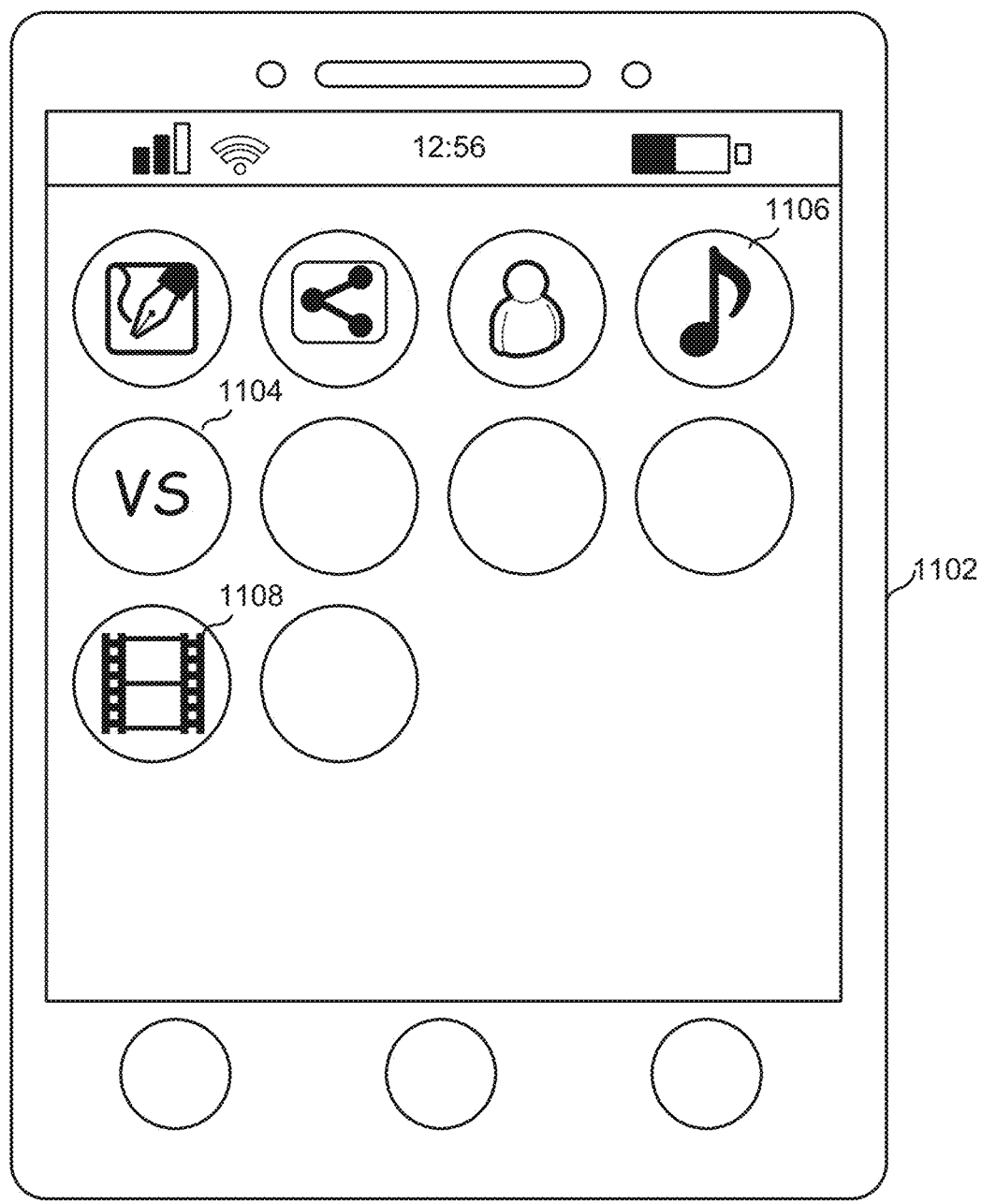
FIG. 11 is an illustration of a user interface of a user device as might be used to interact within a social circle.

FIG. 11 is an illustration of a user interface of a user device as might be used to interact within a social circle. In a first state, the user interface is at a home screen as illustrated by a display presentation 1102. Display presentation 1102 includes a set of icons from which the user can select. Icon 1104 is one such icon. Icon 1104 represents a social circle app that the user of the user device can activate and deactivate. Other icons, also representing apps that can be executed include a music app icon 1106 and a video app icon 1108. Those other apps might interact with the social circle app, such as by automatically sending a message to the social circle app each time a song or a video is played.

Example Use Cases

1) Hosting a dinner party: The host of the party activates their social circle app. When the first guest arrives, the host's social circle app detects the arrival of a new user device and creates a new social circle automatically. The host goes over to their media player and starts playing music, the media play automatically adds each song, as it plays, to the social circle. This information is stored in the social circle data record for the social circle formed for that dinner party. As more guests arrive and take their seats on the dinner table, one person takes a picture of the group and their camera app automatically adds the photo to the social circle so it appears as an asset of that social circle. All the guests present have access to that photo. Later in the evening during a conversation, one of the guests mentions a great restaurant they found recently. They grab their phone and share the results of a restaurant review web page with the social circle. Later, a friend sees a new vase at the host's house and the host mentions posts a link to an online shopping site where they purchased the vase. Eventually, when all the guests leave, the social circle is closed. The posted assets stay viewable but users can no longer add new content.

2) Sync with Partner: During the holiday season, your partner and you keep a list of gifts that you need to buy. You manually create a private social circle and create a new "ToDo Check List". You add a couple of gift ideas to the list and then you share the social circle with your partner. Your partner is notified of the new social circle and joins. Your partner gets the list and adds a couple of new gift ideas to the list and deletes a third. As time goes by, both your partner and you buy gifts from the list and mark items as "Completed". You create a Calendar item and share it with your partner. Both add events to the shared social circle that require attendance of both of you.

3) Business meeting: A meeting organizer sets up an in-person meeting and a social circle. As attendees show up to the meeting, they are added as members to the social circle. During the meeting, someone shares a document, which is added to the social circle. The document is marked "Don't keep" (so it cannot be saved locally) and "geo-fenced" (so it cannot be viewed by an attendee who has left. Everyone in the room can view the document. After a while, some of the attendees leave the room, they are automatically removed from the social circle, and the shared document becomes un-viewable to them. The rest of the attendees can still view the document.

4) Billboard: At a live music event, the organizing venue sets up a social circle to share information about the merchandise or food that is available at the event. Similarly, a restaurant may easily share the specials or happy hour menu with its patrons.

5) eCommerce Integration: A social circle might be integrated with a music purchasing service so that each song that plays on a media server is added to the social circle's assets and when viewed by members, a quick purchase button is displayed next to the reference to the son, allowing that member to quickly buy the song. Shared movie trailers might have a like to buy or rent the movie. Shared photos might be displayed with a photo printing service link. For a dinner party, recipes and online grocery ordering might be available based on the assets, such as where the dinner host added their recipe to the social circle.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of generating and managing access to online assets created in a context of a social circle by members of a social group engaging in an event, the method comprising:
   creating a social circle data record using a social circle management program;
   identifying, for the event, a proximity rule stored by the social circle management program;
   including, in the social circle data record, a first reference to a first user device;
   determining a first location, wherein the first location is a physical location of the first user device;
   determining a second location, wherein the second location is a physical location of a second user device;

determining that the first location and the second location satisfy the proximity rule for the event;
including, in the social circle data record, a second reference to the second user device;
receiving first data from the first user device;
including, in the social circle data record, a first asset reference corresponding to the first data, the first asset reference including a first timestamp corresponding to a first receipt time of the first data;
receiving second data from the second user device;
including, in the social circle data record, a second asset reference corresponding to the second data, the second asset reference including a second timestamp corresponding to a second receipt time of the second data;
determining that the second user device is at a third location;
determining that the third location and the first location do not satisfy the proximity rule for the event;
recording, in the social circle data record, a first departure time corresponding to a time that the third location and the first location were determined to not satisfy the proximity rule for the event;
receiving third data from the first user device after the first departure time;
including, in the social circle data record, a third asset reference corresponding to the third data, the third asset reference including a third timestamp corresponding to a third receipt time of the third data; and
providing the first data that was received at the first receipt time from the first user device and the second data that was received at the second receipt time from the second user device to the second user device while excluding the third data if a comparison of the third timestamp and the first departure time indicates that the third receipt time of the third data, to which the third timestamp corresponds, is after the first departure time.

2. The method of claim 1, further comprising:
determining a fourth location of a third user device;
determining that the fourth location and the first location satisfy the proximity rule for the event;
including, in the social circle data record, a third reference to the third user device;
determining a membership time period for the third user device, wherein the membership time period represents time periods for which the fourth location and the first location satisfy the proximity rule for the event; and
including, in the social circle data record, the membership time period for the third user device.

3. The method of claim 2, further comprising:
prior to including the third reference to the third user device in the social circle data record, sending a first invitation message to the third user device;
receiving a first response to the first invitation message, wherein the first response indicates an acceptance of entry to the social circle;
sending a second invitation message to the first user device or the second user device; and
receiving a second response to the second invitation message, wherein the second response indicates an acceptance message indicating acceptance of the third user device into the social circle.

4. The method of claim 1, further comprising:
adding, to the social circle data record, a reference to a control message, wherein the control message comprises a set of executable instructions that direct a receiving user device that receives the control message to perform actions specified by the set of executable instructions; and
providing the control message to the first user device and the second user device.

5. A method of generating and managing assets for social circles related to members of a social group engaging in an event, the method comprising:
creating a social circle data record for a social circle for the event;
identifying a joining condition for the event;
determining that a first user device meets the joining condition;
including, in the social circle data record, a first reference to the first user device;
storing a first joining time of the first user device, wherein the first joining time represents a time at which the first user device joined the social circle;
determining that a second user device meets the joining condition;
including, in the social circle data record, a second reference to the second user device;
storing a second joining time of the second user device, wherein the second joining time represents a time at which the second user device joined the social circle;
receiving first data from the first user device;
including, in the social circle data record, a first asset reference corresponding to the first data, the first asset reference including a first timestamp corresponding to a first receipt time of the first data;
determining a first departure time for the second user device, the first departure time indicating that the second user device meets a departure condition;
including, in the social circle data record, the first departure time of the second user device;
receiving second data from the first user device after the first departure time;
including, in the social circle data record, a second asset reference corresponding to the second data, the second asset reference including a second timestamp corresponding to a second receipt time of the second data;
providing the first data to the second user device; and
excluding the second data if a comparison of the second timestamp and the first departure time indicates that the second receipt time of the second data, to which the second timestamp corresponds, is after the first departure time.

6. The method of claim 5, further comprising:
identifying a social circle deletion condition for the social circle, where the social circle deletion condition is representable by a social circle deletion expression capable of being evaluated by a computer process;
determining that the social circle deletion condition is met;
deleting the social circle data record; and
deleting assets associated with the social circle data record.

7. The method of claim 5, further comprising:
including, in the social circle data record, a third reference to an identifier of a user device designated as a manager user device;
writing, into the social circle data record, rights settings parameters that defines which actions are permitted by which user devices; and
setting a first rights setting parameter to indicate that the manager user device is allowed to post broadcast assets and other user devices are not allowed to post broadcast assets, wherein a broadcast asset is an asset of a type designated in the social circle data record as being an asset that is broadcast by the manager user device.

8. The method of claim 5, wherein determining that the second user device meets the joining condition comprises:
determining a first location of the first user device;
determining a second location of the second user device;
comparing the first location and the second location; and
determining that the first location and the second location are separated by less than a threshold distance specified by the joining condition.

9. The method of claim 5, further comprising:
determining a third location of a third user device;
determining that the third location and one or both of a first location of the first user device or a second location of the second user device satisfy a proximity rule for the event;
sending a first invitation message to the third user device;
receiving a first response to the first invitation message, wherein the first response indicates an acceptance of entry to the social circle by the third user device;
sending a second invitation message to the first user device, wherein the first user device controls acceptance of devices into the social circle data record;
receiving a second response to the second invitation message from the first user device, wherein the second response indicates an acceptance of entry of the third user device to the social circle data record; and
adding the third user device to the social circle data record.

10. The method of claim 5, further comprising:
storing the social circle data record into cloud-based storage at a first cloud location;
storing, into the cloud-based storage, the first asset reference; and
storing, into the cloud-based storage, the first data at a second cloud location distinct from the first cloud location.

11. The method of claim 5, further comprising:
adding, to the social circle data record, a reference to a control message, wherein the control message is a message for controlling user devices; and
providing the control message to the first user device and the second user device.

12. A social networking system for managing a plurality of social circles associated with events and assets associated with actions performed by users in the plurality of social circles at those events, comprising:
memory storage for a social circle data structure corresponding to a social circle and assets associated with the social circle; and
at least one computing device configured to implement one or more services, wherein the one or more services are configured to:
determine a social circle creation condition for a social circle for an event;
create a social circle data record for the event;
identify, from the social circle data record, a joining condition for the event;
determine if a first user device meets the joining condition;
include, in the social circle data record, a first reference to the first user device if the first user device meets the joining condition;
record a first joining time of the first user device, wherein the first joining time represents when the first user device joined the social circle;
determine if a second user device meets the joining condition;
include, in the social circle data record, a second reference to the second user device if the second user device meets the joining condition;
record a second joining time of the second user device, wherein the second joining time represents when the second user device joined the social circle;
receive first data from the first user device;
include, in the social circle data record, a first asset reference corresponding to the first data, the first asset reference including a first timestamp corresponding to a first receipt time of the first data;
provide the first data to the second user device;
determine a first departure time for the second user device, the first departure time indicating that the second user device meets a departure condition;
include, in the social circle data record, the first departure time of the second user device;
receive second data from the first user device after the first departure time;
include, in the social circle data record, a second asset reference corresponding to the second data, the second asset reference including a second timestamp corresponding to a second receipt time of the second data; and
provide the second user device with the first asset reference while excluding the second asset reference, wherein the second asset reference is excluded if a comparison of the second timestamp and the first departure time indicates that the second receipt time of the second data, to which the second timestamp corresponds, is after the first departure time.

13. The social networking system of claim 12, wherein the at least one computing device configured to implement one or more services, are further configured to:
identify a social circle deletion condition for the social circle, where the social circle deletion condition is representable by a social circle deletion expression capable of being evaluated by a computer process;
determine that the social circle deletion condition is met;
delete the social circle data record; and
delete assets associated with the social circle data record.

14. The social networking system of claim 12, wherein the at least one computing device is further configured to implement one or more services configured to:
include, in the social circle data record, a third reference to an identifier of a user device designated as a manager user device;
write, into the social circle data record, rights settings parameters that defines which actions are permitted by which user devices; and
set a first rights setting parameter to indicate that the manager user device is allowed to post broadcast assets and other user devices are not allowed to post broadcast assets, wherein a broadcast asset is an asset of a type designated in the social circle data record as being an asset that is broadcast by the manager user device.

15. The social networking system of claim 12, wherein the at least one computing device is further configured to implement one or more services configured to:
determine a first location of the first user device;
determine a second location of the second user device;
compare the first location and the second location; and
determine that the first location and the second location are separated by less than a threshold distance specified by the joining condition.

16. The social networking system of claim 12, wherein the at least one computing device is further configured to implement one or more services configured to:
- determine a third location of a third user device;
- determine that the third location and one or both of a first location of the first user device or a second location of the second user device satisfy a proximity rule for the event;
- send a first invitation message to the third user device;
- receive a first response to the first invitation message, wherein the first response indicates an acceptance of entry to the social circle by the third user device;
- send a second invitation message to the first user device, wherein the first user device controls acceptance of devices into the social circle data record;
- receive a second response to the second invitation message from the first user device, wherein the second response indicates an acceptance of entry of the third user device to the social circle data record; and
- add the third user device to the social circle data record.

17. The method of claim 1, further comprising:
- determining a social circle closing condition for the social circle, wherein the social circle closing condition is met when no pair of user devices in the social circle meet the proximity rule for the event;
- detecting that the social circle closing condition is met; and
- modifying the social circle data record to indicate that the social circle is closed to further updates.

18. The method of claim 5, further comprising:
- identifying, from the social circle data record, a social circle closing condition for the event;
- detecting that the social circle closing condition is met; and
- modifying the social circle data record to indicate that the social circle is closed to further updates.

19. The social networking system of claim 12, wherein the at least one computing device is further configured to implement one or more services configured to:
- identify, from the social circle data record, a social circle closing condition for the event;
- detect that the social circle closing condition is met; and
- modify the social circle data record to indicate that the social circle is closed to further updates.

\* \* \* \* \*